United States Patent [19]

Guter

[11] 4,206,048

[45] Jun. 3, 1980

[54] PROCESS FOR PURIFICATION OF CONTAMINATED WATER

[76] Inventor: Gerald A. Guter, 215 Via Socorro, San Clemente, Calif. 92672

[21] Appl. No.: 924,933

[22] Filed: Jul. 17, 1978

[51] Int. Cl.$^2$ .................... B01D 13/00; B01D 15/06
[52] U.S. Cl. .................. 210/22 C; 210/23 H; 210/27; 210/3 O R; 210/37 R
[58] Field of Search .......... 210/22, 23 H, 24, 30 R, 210/37 R, 38 R, 27, 25, 7 M, 321 R, 73 R, 433 M, 259, 266, 295

[56] References Cited

U.S. PATENT DOCUMENTS

| | | | |
|---|---|---|---|
| 2,157,511 | 5/1939 | Urbain et al. | 210/37 R |
| 3,526,320 | 9/1970 | Kryzer | 210/254 |
| 3,639,231 | 2/1972 | Bresler | 210/23 |
| 3,715,287 | 2/1973 | Johnson | 210/259 |
| 3,823,086 | 7/1974 | Schmidt | 210/321 R |
| 3,836,458 | 9/1974 | Wallis et al. | 210/23 H |
| 3,973,987 | 8/1976 | Hewitt et al. | 210/321 R |

OTHER PUBLICATIONS

"Potable Water from Hospital Wastes by Reverse Osmosis", Chem. Eng. Prog. Symposium Series, vol. 64, No. 90, 1968, A. Gouveia et al.
"Polymetrics Reverse Osmosis for High Purity Water", Polymetrics, Inc., received 9/15/1970, pp. 1–6.

*Primary Examiner*—Charles N. Hart
*Assistant Examiner*—David R. Sadowski

*Attorney, Agent, or Firm*—Max Geldin

[57] ABSTRACT

A process for removing nitrate ions from a contaminated aqueous feed solution containing the same, and also chloride ion, by forcing the solution through a reverse osmosis membrane which permits passage of nitrate ions through the membrane and into the product water while rejecting chloride ion and other anions such as sulfate and bicarbonate, and concentrating such anions in the brine waste water. An anion exchange resin bed charged in the chloride form is placed in the product water during the reverse osmosis operation. Reverse osmosis product water containing nitrate is treated by the anion exchange resin bed to remove the nitrate ions and replace them with chloride ions. The resulting product water is essentially free of the nitrate impurity and a concentrated waste brine stream is obtained containing essentially chloride salts. In a preferred embodiment, when such anion exchange bed has exhausted the chloride ions and becomes loaded with nitrate ions, the resulting anion exchange resin charged with nitrate is placed in the concentrated waste brine stream to regenerate the anion exchange resin with an equivalent amount of chloride ion, liberating the nitrate ion in concentrated form into the waste brine concentrate stream from the reverse osmosis system. Thus, ionic impurities such as nitrate ion are concentrated in the waste brine solution. The same process will remove contaminant ions similar to nitrate such as arsenate, selenate and borate.

10 Claims, 1 Drawing Figure

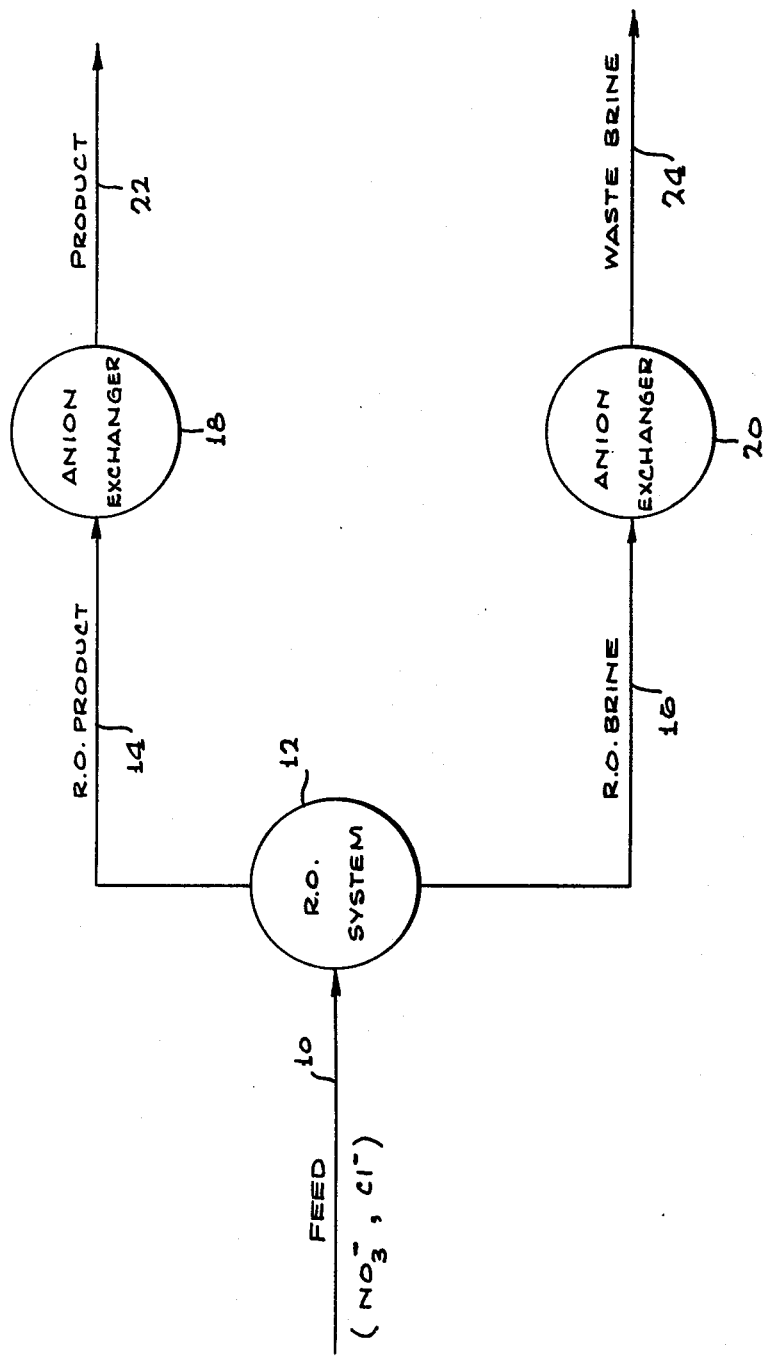

PROCESS FOR PURIFICATION OF CONTAMINATED WATER

FIELD OF THE INVENTION

This invention relates to purification of impure water containing impurities such as nitrate ion, and nitrate type ions such as selenate and borate, and excessive TDS (total dissolved solids), and is particularly directed to novel procedure for removing ionic impurities such as nitrate ion, and also reducing excessive total dissolved solids (TDS) from such impure water, to produce a product water having substantially reduced contents of impurities such as nitrate ion and nitrate type ions, and reduced TDS, for use of such product water as drinking water.

BACKGROUND OF THE INVENTION

Various procedures are known for reducing the TDS content of an impure salt-laden water sufficiently to permit the water to be used for drinking or for industrial use, e.g. as a cooling water. Such processes include reverse osmosis, ion exchange, and electrodialysis. Where impure water containing highly concentrated amounts of salts or impurities are involved, other processes such as multiple-effect evaporation are employed.

Reverse osmosis involves the use of a semi-permeable membrane, such as the known cellulose acetate membrane, which, under the application of pressure to a feed stream, permits passage of water molecules but holds back or rejects all or part of the undesirable solute in the feed stream. Reverse osmosis is particularly applicable for removing or rejecting chloride ion from an aqueous feed solution containing such ion.

Certain ionic constituents or impurities in aqueous solutions can be removed by ion exchange, employing various types of ion exchange resins, as known in the art.

For removal of various types of ionic impurities in water, processes have been developed employing the combination of ion exchange resins and reverse osmosis. Thus, U.S. Pat. No. 3,639,231 discloses a process for desalination of brackish water by first treatment with ion exchange resins and then by reverse osmosis. The waste stream from the reverse osmosis treatment can be used to regenerate one of the ion exchange beds.

U.S. Pat. No. 2,771,418 pertains to a method of regenerating an ion exchanger used in the conversion of a nitrate salt solution and a chloride salt solution.

U.S. Pat. No. 3,836,458 relates to a water purification system wherein the water passes through a series of filters, the water then passes through a reverse osmosis unit, followed by passage through a mixed resin bed. This process produces deionized water which is not suitable for use in a public water supply system.

U.S. Pat. No. 3,823,068 discloses a pretreatment process for increasing the useful life of a reverse osmosis membrane, by passing a reverse osmosis influent initially through a strong basic anion exchange resin until carbonate ions are detected in the resin bed effluent, and passing such effluent through a reverse osmosis membrane.

However, the prior art as exemplified above has failed to develop, to applicant's knowledge, an efficient method for removing or substantially reducing the concentration of certain ionic impurities, especially nitrate ion, and nitrate type ions, as well as chloride ion, and reducing excessive TDS in impure aqueous solutions containing such ions or the corresponding salts, to produce quality drinking water suitable for distribution in public water supply systems.

It is accordingly one object of the present invention to purify water contaminated with impurities of the class of nitrates, arsenates, selenates, and borates. Another object is to provide a relatively simple and inexpensive process of the above type, wherein the above noted class of impurities are present in combination with chlorides. A still further object is the provision of efficient procedure employing a certain combination of reverse osmosis and anion exchange, for removing or substantially reducing impurities such as nitrates, arsenates, selenates and borates, particularly nitrates, in combination with chlorides, in aqueous solutions containing such impurities, and reducing excessive TDS, to provide a product water suitable for drinking, while producing a concentrated waste stream containing such impurities.

SUMMARY OF THE INVENTION

It has been found as a basic feature and concept of the present invention that when an aqueous solution containing nitrate ion or similar ions which are termed herein "nitrate type" ions, and including arsenate, selenate or borate ions, is subjected to reverse osmosis, such ions pass through the reverse osmosis membrane and appear in the product water, whereas the chlorides and similar anions such as bicarbonates and sulfates, are rejected and are concentrated in the waste brine. Thus, the invention process is based on the anomalous behavior of nitrate or nitrate-type ions, in the reverse osmosis process.

Accordingly, treatment of nitrate-laden drinking water by only reverse osmosis is effective for removal of salts, such as chlorides, bicarbonates and sulfates in the rejected waste stream, but such treatment is ineffective for nitrate removal. Thus, the product water of reverse osmosis is relatively high in nitrate and low in other salts, such as chloride, and conversely, the waste brine from the reverse osmosis process is very high in other salts such as chloride and relatively low in nitrate.

According to another feature of the invention, the nitrate can be removed from the reverse osmosis product water with anion exchange resins and replaced with chloride, bicarbonate, or sulfate to give a low TDS, substantially nitrate-free water. This is accomplished by placing an anion exchange resin bed charged in the chloride form in the product water during the reverse osmosis operation. The reverse osmosis product water containing nitrate is treated by the anion exchange resin bed to remove the nitrate ions and replace them with chloride ions.

According to a preferred embodiment, when such anion exchange resin bed has exhausted the chloride ion and become loaded with nitrate ions, the resulting anion exchange resin bed charged with nitrate is regenerated with chloride ion by placing such nitrate loaded ion exchange resin in the concentrated waste brine stream from the reverse osmosis operation.

Thus, the ion exchange resin beds can be placed in both the product and brine streams during reverse osmosis operations. When the anion exchange bed in the waste brine stream becomes charged, for example, with chloride, such regenerated ion exchange resin bed is then placed in the product stream where through ion exchange, it removes nitrate and the nitrate in the product stream is replaced with an equivalent amount of chloride ion. The anion exchange resin in the product water stream, and which is now charged with nitrate, is again placed in the waste brine stream where its nitrate content is again replaced by the chloride of the brine, to regenerate the resin.

According to the invention process, the cation composition, e.g. sodium and potassium of the aqueous feed water is preserved in the product water, while the contaminant anions, e.g. nitrate, are removed and replaced with chloride or other types of acceptable ions in the product water. Thus, the product water of the present invention distinguishes from the prior art, for example, in not removing all ions from the aqueous feed solution, and leaving a product water which has a sufficiently reduced concentration of anions, particularly nitrate, so that it can be distributed through a water system. The product water produced according to the invention process has a reduced TDS range of about 25 to 500 ppm, and is relatively non-corrosive.

Thus, the invention is directed to a process which employs both reverse osmosis and ion exchange to remove nearly all of the nitrate ion from drinking water without the use of extraneous chemicals to regenerate the ion exchange resin. The drinking water will contain a substantially reduced TDS, and a substantially reduced content of both nitrate or nitrate-type ions, and chloride or similar ions, as compared to the initial aqueous feed solution, the content of such ionic impurities in the product water being sufficiently low to permit the product water to be used as drinking water, but sufficiently high to allow the water to be distributed through a public water system without excessive corrosion of the system.

In a broad sense there is provided according to the present invention a process for removing a first ionic impurity selected from the group consisting of nitrate, arsenate, selenate, and borate ions, and mixtures thereof, and a second ionic impurity selected from the group consisting of chloride, bicarbonate and sulfate ions, and mixtures thereof, from an aqueous feed solution containing the same, which comprises:

(a) forcing said solution through a reverse osmosis membrane which permits passage therethrough of said first ionic impurity and permits said first ionic impurity to remain in the product water, and rejects said second ionic impurity and concentrates said second ionic impurity in a brine waste water;

(b) contacting said product water with an anion exchange resin to remove said first ionic impurity from said product water and replace it with said second ionic impurity, charging said anion exchange resin with said first ionic impurity; and (c) collecting said product water having a substantially reduced content of said first ionic impurity as compared to the aqueous feed solution.

According to a preferred embodiment of the invention process, following steps (a) and (b) above, such preferred embodiment includes the following steps.

(c) contacting said brine waste water containing said second ionic impurity with the spent anion exchange resin from (b) to replace said first ionic impurity thereof with said second ionic impurity to regenerate said anion exchange resin for use in (b); and (d) collecting said product water having a substantially reduced content of said first and second ionic impurities as compared to the aqueous feed solution.

THE DRAWING

The drawing illustrates a flow diagram for the invention process.

PREFERRED EMBODIMENTS OF THE INVENTION

The drawing illustrates procedure according to the invention process for removal or substantial reduction in concentration of nitrate ion, as well as removal or substantial reduction of chloride ion, in an aqueous feed solution, to produce a potable water product. An aqueous feed water, e.g. a tap water, containing nitrate and chloride ions in the form of sodium nitrate and sodium chloride, is introduced at 10 into a reverse osmosis system, shown at 12 in the drawing. Such reverse osmosis system can be operated at high feed pressures up to about 1,500 psi, for example, or higher, or at relatively low feed pressures e.g. at low tap water pressures of the order of about 20 to about 75 psi, the general range being from about 10 to about 2,000 psi. The reverse osmosis membrane can be the conventional cellulose ester, e.g. cellulose acetate, semi-permeable membrane, e.g. as described in Manjikian et al, U.S. Pat. No. 3,344,214, or any other reverse osmosis membrane such as hollow fiber type membranes.

The major portion, e.g. 75–90%, of the water in the feed passes through the membrane as reverse osmosis product at 14, having a substantially reduced TDS, which is essentially chiefly nitrate salt, since such reverse osmosis membranes permit passage of a substantial amount of the nitrate through the membrane with very low rejection thereof. However, the amount of rejection of the nitrate by the membrane can range from 0 to about 80%, depending on the conditions of operation such as operating pressure, type and age of membrane used and ionic composition of and the presence of other ions in the feed water. On the other hand, substantially all of the chloride is rejected by the reverse osmosis membrane and is concentrated in the reverse osmosis brine at 16 comprising for example 10–25% of the aqueous feed volume.

Anion exchange resin beds 18 and 20 are placed in the product and brine streams 14 and 16, respectively, during the reverse osmosis operation. Such anion exchange resins can be any of the conventional type of such resins, e.g. the Rohm and Haas Amberlite IRA-410 styrene-divinylbenzene copolymer with quaternary amine groups. Another anion exchange resin is Diamond Shamrock's ES-104, comprising a polystyrene resin containing quaternary ammonium groups. Other suitable anion exchange resins are Amberlite IR-45, IRA-910 and IRA-402.

The resin bed 18 through which the aqueous reverse osmosis product solution 14 passes, was previously charged with chloride ion, and as a result of passage of the aqueous product 14 therethrough, nitrate ions are absorbed on the resin bed and an equivalent amount of chloride ion is released into the product stream. The resin bed 20 is initially charged with nitrate ion and when the concentrated reverse osmosis brine solution passes through such resin bed, such resin bed absorbs chloride ion and the nitrate is removed and is released into the waste brine. Thus, the final product at 22 is substantially free of nitrate or has a low concentration of nitrate ion and is otherwise characteristic of the reverse osmosis product, while the waste brine concentrate at 24 contains practically all of the nitrate ion and is otherwise characteristic of the reverse osmosis waste brine material.

During the reverse osmosis operation, when the anion exchange bed 20 becomes charged with chloride, it is transferred and used as the anion exchange bed 18 for treatment of the reverse osmosis product, as noted above. Also, when the anion exchange bed 18 becomes spent and is charged with nitrate ion, it is placed in the concentrated brine stream 16 to function as the anion exchange bed 20.

Thus it is seen that when the anion exchange bed 18 becomes charged with nitrate, by placing such bed in the reverse osmosis concentrated brine stream 16, the anion exchange bed 18 is regenerated with chloride ion. Accordingly, since the waste reverse osmosis brine stream 16 is rich in chloride, such brine stream can be employed as a regenerant, thus saving all or at least a portion of the chemical cost of regeneration of the spent anion exchange bed 18. When the brine stream is so used, the ratio of any nitrate to other anions in the product stream 22 can be controlled by the brine composition. The nitrate content of the final aqueous product 22, however, is limited generally to a small fraction of the final product anion content. Also, the chloride content of such final product at 22 is substantially less than in the feed solution.

The following are examples of practice of the invention.

EXAMPLE 1

A reverse osmosis system in combination with anion exchange beds placed in the product stream and waste concentrated brine stream, as described above and illustrated in FIG. 1 of the drawing, was used for the treatment of a feed water containing sodium chloride and sodium nitrate with TDS of 300 ppm. The feed solution was under a pressure of 300 to 400 psi. The reverse osmosis system employed a cellulose acetate membrane.

The water supply or water feed contained 72.9 ppm nitrate ion and 121.4 ppm chloride ion. The reverse osmosis process was run under conditions to obtain 90% water recovery with an 85% rejection for sodium chloride and 45% rejection of sodium nitrate.

Following passage of the product stream through the bed of anion exchange resin containing sodium chloride as indicated at 18, the resulting product stream, as indicated at 22, contained TDS about 114.5 ppm. including 58.0 ppm chloride ion and 13.8 ppm nitrate ion, both substantially below the concentration of both of these ions in the initial feed solution, and suitable for use as potable water.

Following passage of the concentrated reverse osmosis brine as at 16, through the anion exchange bed containing nitrate ion, as at 20, the resulting concentrated waste brine had TDS 1,983 ppm, comprised of 702.7 ppm chloride ion and 601.8 ppm nitrate ion.

In the process of the present example, it is thus seen that in the anion exchange bed at 18, nitrate ion in the product stream is exchanged for chloride ion absorbed on the resin, and such chloride ion goes into solution, providing a low nitrate, low TDS product water, containing some chloride ion.

The reverse osmosis brine concentrate regenerates the resulting anion exchange resin containing nitrate ion which is placed in the reverse osmosis stream at 20, since the concentrated brine at 16 has a high and excessive chloride concentration to effect the regeneration. Following such regeneration of the anion exchange resin at 20 and the formation of the spent ion exchange resin at 18, the ion exchange beds are again exchanged, with the regenerated chloride-containing bed at 20 being placed at position 18 and the nitrate-containing bed at 18 being positioned at 20.

During the regeneration of the spent bed 18, when placed at position 20 in the brine waste stream, nitrate ion was thus added to the brine waste stream, which nitrate ion was previously absorbed when the bed was at position 18. The overall process of this example was effective in removing 81% of the nitrate from the input stream, and 10% of the water.

Because the concentrated brine stream from the reverse osmosis operation contains some nitrate ion, complete nitrate removal from the product stream can be accomplished only by supplemental regeneration of the anion exchange bed with a 100% sodium chloride brine or by adding an additional anion exchange polishing bed to the product stream which is regenerated by 100% sodium chloride. However, in practice such additional treatment is not necessary because low nitrate levels can be tolerated in drinking water.

EXAMPLE 2

The process of Example 1 is repeated employing a feed water having the same concentrations of sodium chloride and sodium nitrate as the feed water in Example 1.

The present example is also based on a 90% water recovery, but is operated under conditions where a greater difference exists between the percentages of rejection of nitrate and chloride by the reverse osmosis system.

Thus, in the present example reverse osmosis operation is carried out so that the chloride rejection is 90% and the nitrate rejection approaches 0%.

The operation is carried out so that the product contains a TDS of 92 ppm with only 3.58 ppm of nitrate ion. The amount of chloride ion in the final water product is 52.2 ppm.

The process thus removes 95.2% of the nitrate from the feed water, and requires no additional chemicals for regeneration of the anion exchange resin.

Arsenate, selenate and borate ions appear to have the same characteristics as nitrate ions with respect particularlly to the properties of the nitrate ion of passing through a reverse osmosis membrane with the product water, with only a minor amount or relatively little of such ion being rejected and present in the waste brine.

EXAMPLE 3

A five-gallon sample from Well #8 in Delano, California was treated using RO (reverse osmosis) and anion exchange resin. The water quality analysis is given below:

| Constituent | PPM |
| --- | --- |
| Calcium | 47 |
| Magnesium | 4.3 |
| Sodium | 47 |
| Potassium | 4.8 |
| Ammonium | 0.5 |
| Iron | 0.42 |
| Manganese | 0.02 |
| Fluorides | 0.21 |
| Carbonates | 0 |
| Bicarbonates | 98.8 |
| Chlorides | 50.3 |
| Sulfates | 49 |

-continued

| Constituent | PPM |
| --- | --- |
| Sulfides | 0.1 |
| Nitrites | 0.001 |
| Nitrates | 50.1 |
| Arsenic | 0.01 |
| pH | 8.0 |
| TDS | 302 |

The five-gallon sample was concentrated down to 10 percent of its original volume in three RO test cells at 350 psi, each containing four samples of three different membranes. Samples were withdrawn from the product water and brine concentrate at frequent intervals for analysis. The membranes used were:
1. Fresh cellulose acetate
2. Used cellulose acetate
3. Fresh dry-RO (a dry cellulose acetate-type membrane)

The cellulose acetate membranes represent state-of-the-art membrane technology. The #2 membrane had been in use on tap water purification for about 9 months and represents performance which can be expected of aged membranes. The dry-RO membranes were selected as an advanced type membrane.

The RO product water was then treated with a ¼"×6" column of Amberlite 410 anion exchange resin in the chloride form to produce the final product. A comparison of beginning and end conditions is given below:

|  | Initial Sample | Brine Concentrate | RO Product | Final Product |
| --- | --- | --- | --- | --- |
| Volume 1. | 20 | 2 | 18 | 18 |
| TDS ppm | 325 | 1800 | 35 | 32 |
| $NO_3^-$—$NO_2^-$ ppm | 50.1 | 171 | 20.2 | 0 |
| % $NO_3$ in TDS | 15.4 | 9.5 | 57.7 | 0 |

The final results show that nitrate can be completely removed from well water by the invention process. Furthermore, because the concentrated brine contains a low percentage of nitrate compared to the product water following reverse osmosis, the brine is an attractive source of regeneration salts for the anion exchanger. Use of the brine concentrate as regenerant would give a theoretical nitrate level in the end product of approximately 3.04 ppm (9.5% of 32 ppm).

From the foregoing, it is seen that the invention provides a simple and efficient process for the substantial removal of nitrate and equivalent ions noted above from impure water by employing a combination of reverse osmosis and anion exchange, and wherein the nitrate or equivalent ion is removed from the reverse osmosis product water with anion exchange resins and replaced with chloride, and preferably employing the reverse osmosis waste brine as a regenerant for regeneration of the resulting anion exchanger loaded with nitrate ion. The result is that a potable water is produced having a substantially reduced content of both nitrate ion or equivalent, and chloride ion, and having a reduced TDS.

It will be understood that although various changes and modifications can be made in the invention by those skilled in the art, the invention is not to be taken as limited except by the scope of the appended claims.

What is claimed is:

1. A process for removing a first ionic impurity selected from the group consisting of nitrate, arsenate, selenate and borate ions, and mixtures thereof, and a second ionic impurity selected from the group consisting of chloride, bicarbonate and sulfate ions, and mixtures thereof, from an aqueous feed solution containing the same, which comprises:
    (a) forcing said solution through a reverse osmosis membrane which permits passage therethrough of said first ionic impurity and permits said first ionic impurity to remain in the product water, and rejects said second ionic impurity and concentrates said second ionic impurity in a waste water;
    (b) contacting said product water with an anion exchange resin to remove said first ionic impurity from said product water and replace it with said second ionic impurity, and charging said anion exchange resin with said first ionic impurity; and
    (c) collecting said product water having a substantially reduced content of said first ionic impurity as compared to the aqueous feed solution.

2. The process as defined in claim 1, wherein said first ionic impurity is nitrate ion and said second ionic impurity is chloride ion.

3. A process for removing a first ionic impurity selected from the group consisting of nitrate, arsenate, selenate and borate ions, and mixtures thereof, and a second ionic impurity selected from the group consisting of chloride, bicarbonate and sulfate ions, and mixtures thereof, from an aqueous feed solution containing the same, which comprises:
    (a) forcing said solution through a reverse osmosis membrane which permits passage therethrough of said first ionic impurity and permits said first ionic impurity to remain in the product water, and rejects said second ionic impurity and concentrates said second ionic impurity in a waste water;
    (b) contacting said product water with an anion exchange resin to remove said first ionic impurity from said product water and replace it with said second ionic impurity, and charging said anion exchange resin with said first ionic impurity;
    (c) contacting said brine waste water containing said second ionic impurity with the spent anion exchange resin from (b) to replace said first ionic impurity thereof with said second ionic impurity to regenerate said anion exchange resin for use in (b); and
    (d) collecting said product water having a substantially reduced content of said first and second ionic impurities as compared to the concentration of said ionic impurities in the aqueous feed solution.

4. The process as defined in claim 3, wherein the anion exchange resin of (b) is initially charged with said second ionic impurity and the anion exchange resin of (c) is initially charged with said first ionic impurity.

5. The process as defined in claim 3, including employing said regenerated anion exchange resin from (c) charged with said second ionic impurity, in (b).

6. A process for removing nitrate and chloride ions from an aqueous feed solution containing the same, said feed solution being tap water, which comprises:
    (a) forcing said solution through a reverse osmosis membrane which permits passage therethrough of said nitrate ion into the product water and rejects said chloride ion and concentrates said chloride ion in a brine waste water, (b) contacting said product water with an anion exchange resin to remove said nitrate ion from said product water,
(c) contacting said brine waste water containing chloride ion with the spent ion exchange resin from (b) to replace said nitrate ion thereof with said chloride ion to regenerate said anion exchange resin for use in (b); and
(d) collecting said product water having a substantially reduced content of nitrate and chloride ions as compared to the concentration of said ions in the aqueous feed solution, and suitable for drinking.

7. The process as defined in claim 6, wherein the anion exchange resin of (b) is initially charged with chloride ion and the anion exchange resin of (c) is initially charged with nitrate ion.

8. The process as defined in claim 6, including employing said regenerated anion exchange resin from (c) charged with chloride, in (b).

9. The process as defined in claim 6, wherein said product water in (d) has a substantially reduced TDS.

10. The process as defined in claim 6, wherein said product water in (d) has a TDS ranging from about 25 to 500 ppm.

* * * * *